United States Patent [19]
Songer

[11] Patent Number: 5,864,426
[45] Date of Patent: Jan. 26, 1999

[54] APPARATUS AND METHOD FOR INCREASING BLUE COMPONENT GAIN FROM A VIDEO PROJECTION SCREEN

[75] Inventor: Jimmie D. Songer, Burleson, Tex.

[73] Assignee: Magma, Inc., Fort Worth, Tex.

[21] Appl. No.: 555,675

[22] Filed: Nov. 13, 1995

[51] Int. Cl.$^6$ .................................................. G03B 21/56
[52] U.S. Cl. ........................................... 359/452; 359/443
[58] Field of Search ..................................... 359/443, 452

[56] References Cited

U.S. PATENT DOCUMENTS

| | | | |
|---|---|---|---|
| 3,560,758 | 2/1971 | Swanberg | 250/256 |
| 3,726,583 | 4/1973 | Fujisaki et al. | 350/126 |
| 3,844,644 | 10/1974 | Martinez | 350/117 |
| 5,111,337 | 5/1992 | Martinez | 359/443 |

Primary Examiner—Daniel P. Malley
Attorney, Agent, or Firm—David Newman & Associates, P.C.

[57] ABSTRACT

An apparatus and method for increasing perceived reflectance of the blue component in a video image to achieve a balanced, full-color image when viewed on a video projection screen. The apparatus includes a video projection screen having a plurality of blue reflective elements, interspersed in an even distribution throughout a plurality of standard white reflective elements, for modifying a reflective index of the video projection screen to decrease the gain of the red and green components of a standard video transmission, resulting in an increase in perceived reflectance of the blue component of a video image when projected on the video projection screen. The method comprises the steps of adding blue pigment to a standard white projection screen; decreasing, responsive to the blue pigment, a red-green gain; and viewing a balanced, full-color image having a perceived increase in the reflective intensity of the blue component.

5 Claims, 1 Drawing Sheet

APPARATUS AND METHOD FOR INCREASING BLUE COMPONENT GAIN FROM A VIDEO PROJECTION SCREEN

BACKGROUND OF THE INVENTION

This invention relates to a multi-reflective index, front or rear video projection screen to achieve a balanced, full-color image within the operating parameters of state-of-the-art video projectors.

DESCRIPTION OF THE RELEVANT ART

Projection screens for the display of motion picture films are usually calibrated to a single reflective index because the images transmitted by motion-picture film projectors provide uniform distribution of the full spectrum of reflective color.

The circuitry driving a video projector divides the chrominance information into three component colors: red, green, and blue. Each component color is displayed through an individual video-projection tube, being a monochrome tube with its image transmitted through a chromatic filter. The red, green, and blue tubes are precisely focused on the projection screen to form a single full-color image.

The red component represents about 33% of a full-color, white image, the blue component about 11%, and the green component about 56%. Because blue emits from the short-wave end of the color spectrum, less light penetrates the blue filter than the light transmitting through the other two filters, a fact well known in the video projection industry.

To produce a balanced, full-color image from a video projector, the blue component transmission is calibrated at a greater intensity of brightness than the red or green component transmissions. Even so, the blue component suffers, the most telling consequence being "blooming" or "flat-topping" of the blue tube, wherein the blue tube cannot attain the level of lumen intensity generated by the red tube and the green tube.

Since the limits of video projection technology for producing an adequately intense blue component are strained, this invention modifies the reflective index of the video projection screen to create the perception of a stronger blue component intensity through reduction of the red and green reflectance. Rather than a screen reflecting each of the three colors—red, green, and blue—equally, this invention combines a blue reflective element with the white reflective elements during the manufacture of the screen in such proportions that the blue reflective gain becomes higher than the red and green reflective gains.

OBJECTS OF THE INVENTION

A general object of the invention is a video projection screen having a multi-reflective index for increasing the perceived reflectance of the blue component of a full-color white image by a front projection unit, or the transmission of a rear projection unit.

Another object of the invention is a method of increasing the reflectance of the blue component transmitted from a video projector to a projection screen.

An additional object of the invention is a method for modifying a reflective index of a video projection screen to create a multi-reflective index suitable for use with video projections.

A further object of the invention is a method for achieving a balanced, full-color image from a full-color-white image such as that produced by a video projector by increasing perceived blue component reflectance relative to red and green reflectance.

SUMMARY OF THE INVENTION

According to the present invention, as embodied and broadly described herein, a system and method for producing a balanced, full color image from a video projector, as perceived by a viewer, through increased blue component reflectance relative to red and green reflectance is provided. The system comprises a video projection screen for improving color distribution in a projected or transmitted video image having a red component, a green component and a blue component. The projection screen includes a plurality of white reflective elements for reflecting the projected video image and a plurality of blue reflective elements, interspersed with the plurality of white reflective elements, for reflecting the projected video image and for increasing the reflective gain of the blue component of the projected video image.

The present invention also includes a method for improving a video image by increasing perceived reflectance of a blue component from a video projector, as seen by a viewer. The method comprises the steps of adding, in an even distribution, a plurality of blue-pigmented elements to a plurality of standard white elements of a video projection screen material, and decreasing, responsive to the addition of the blue-pigmented elements, the red and green gain. The reduction in red and green gain results in an increase in the perceived reflective intensity of the blue component of the video image.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
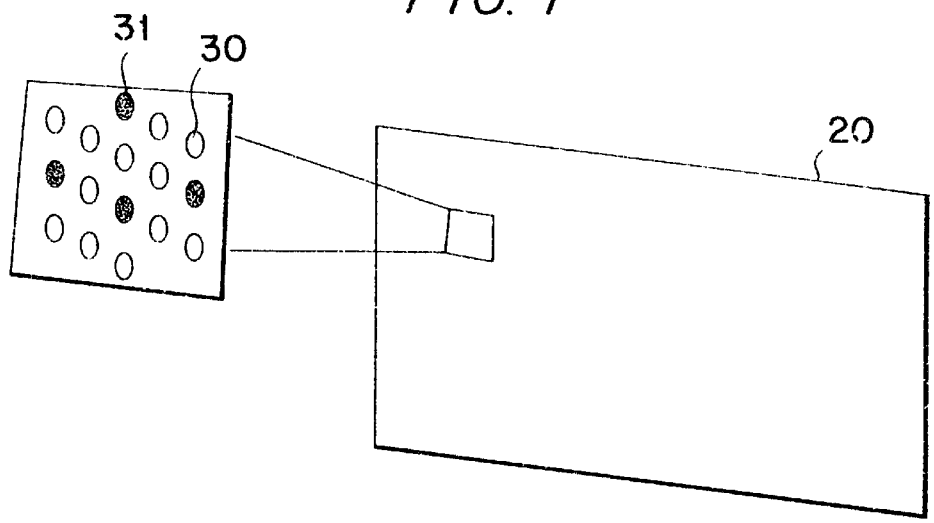
FIG. 1 is an illustration of the interspersal of blue reflective elements among the white reflective elements in a video projection screen according to the present invention.

Pure white northern daylight measures an intensity of 6500° K, containing a balance between the blue, the red, and the green intensities. This invention requires the addition of blue pigment to the standard white pigment of projection screen material, evenly distributed, to boost the reflective intensity to a higher Kelvin degree, reflecting more blue than red-green.

This increase in the spectral response of the blue gain lowers the gain of the red and green components, providing greater blue reflectivity to compensate for the shortcomings of the blue component intensity of the video projector. Such a balance delivers a superior video image with state-of-the-art video projectors.

The system of the present invention comprises a video projection screen for front or rear display of a projected video image. The video projection screen includes a plurality of white reflective elements and a plurality of blue reflective elements. The plurality of blue reflective elements are evenly distributed or interspersed amongst the plurality of white reflective elements during manufacture of the video projection screen. Manufacture of the video projection screen is accomplished in accordance with techniques well known in the art. As known in the art, the plurality of white reflective elements and the plurality of blue reflective elements may include glass beads, silicon particles or other equivalent composition.

In use of the video projection screen, a projected video image having a red component, a green component, and a blue component is projected onto a front or a rear video projection screen. The red component represents approximately 33% of the full-color, white image from which the red component, the green component, and the blue component are derived. The blue component comprises approximately 11% of the total white image, and the green component represents approximately 56% of the total full-color, white image. When projected or transmitted against the projection screen, the video image is viewed by a viewer. The image as perceived by the viewer has been improved, however, in that the blue component represents a larger percentage of the total full-color, white image than when initially projected or transmitted from the video projector. This increase in the perceived blue reflectivity is the result of the plurality of blue reflective elements interspersed amongst the white reflective elements in the video projection screen to lower the gain of the red and green components. The result, as seen by the viewer, is a more balanced display of the three color components and an improved color image.

As used herein, the words "projected" and "transmitted", and obvious variants thereof, are intended to convey the typical processes whereby a front projector system and a rear projector system, respectively, create an image on a video projection screen. These processes are well known in the art and one of ordinary skill in the art would know how to implement the present invention as disclosed herein on either of these systems.

Similarly, the word "reflect", and obvious variants thereof, is representative and is intended to apply to either a front projector system or a rear projector system.

The present invention also includes a method for improving a video image by increasing perceived reflectance or transmission of a blue component from a front or rear video projector, respectively. According to the method, blue pigment is added to a standard white video projection screen during manufacture of the screen. Manufacture of the screen may be accomplished by any of the methods well known in the art of video projection screen manufacture. The addition of blue pigment may be accomplished through the even distribution of blue reflective elements amongst a plurality of standard white reflective elements. The method then comprises the steps of modifying, responsive to the added blue pigment, a reflective index of the projection screen. Modification of the reflective index includes an increase in blue gain and a decrease in red and green gain. The method then comprises the steps of projecting or transmitting, using a video projector, a full-color-white image onto the video projection screen; the video projection screen reflects the full-color-white image as an image having increased blue component intensity due to the modified reflective index created by the addition of blue pigment to the screen. A viewer viewing the reflected image will see a balanced, full-color-white image having a perceived blue component of the full-color-white image greater than 11%.

Reference now is made in detail to the present preferred embodiments of the invention, examples of which are illustrated in the accompanying drawings, wherein like reference numerals indicate like elements throughout the several views.

Figure 2:
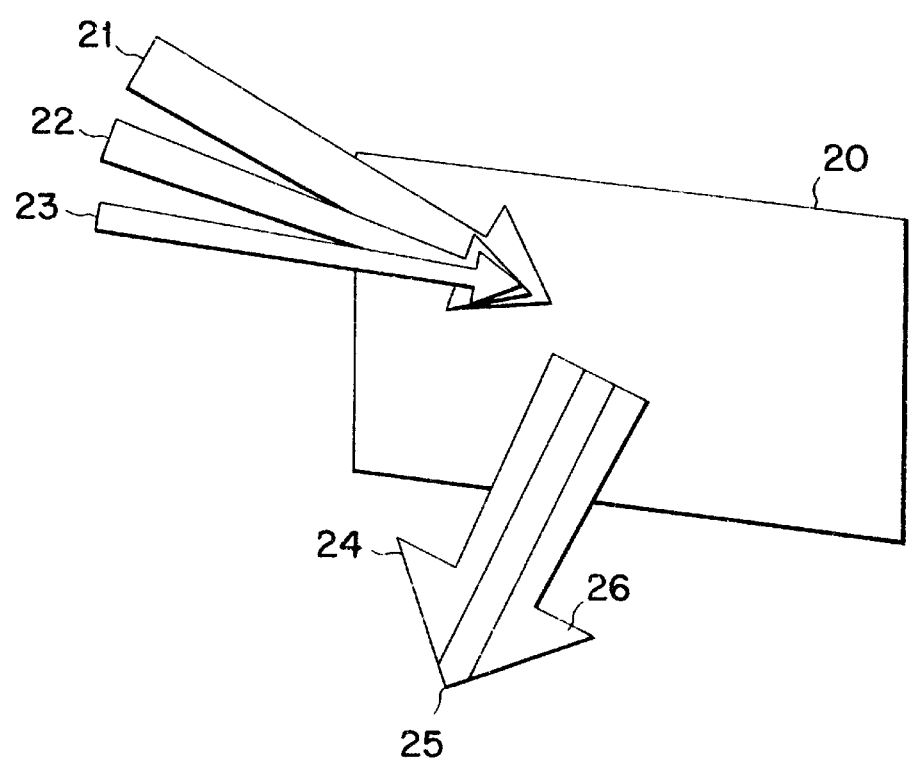
FIG. 2 is an illustrative example of the balancing of red, green and blue reflectance using the video projection screen of the present invention.

As illustratively shown in FIG. 1, a video projection screen 20 according to the present invention comprises a plurality of white reflective elements 30 and a plurality of blue reflective elements 31. As shown in FIG. 2, a video projector transmits chrominance information as three component colors, a green component 21, a red component 22, and a blue component 23. The red component represents about 33% of a full-color, white image, the blue component about 11%, and the green component about 56%. The plurality of blue reflective elements 31 interspersed in the video projection screen 20 decreases the gain of the red and green components to effectively increase the reflective intensity of the blue component 23 of a video projection. The result is a more balanced perception of the three color components as seen by a viewer viewing the video projection screen 20, with the reflected blue component 24 comprising a higher percentage of the total reflected video projection relative to the reflected red component 25 and the reflected green component 26 than was possible before addition of the plurality of blue reflective elements.

Regardless of the physical properties of the screen's reflective elements, be they glass beads or silicon particles for front or rear projection, the proper combination of blue reflective elements providing, for example, a blue reflective gain of 2 and a red and green reflective gain of 1 would, under certain conditions, achieve the proper balance from a state of the art video projector.

It will be apparent to those skilled in the art that various modifications can be made to the apparatus and method of the instant invention without departing from the scope or spirit of the invention. Someone skilled in the art would, for example, be able to use the information contained herein as applied to a front projection screen to create and implement a rear projection screen having equivalent characteristics and capabilities. It is intended that the present invention cover modifications and variations of the apparatus and method for increasing blue component reflectance from a video projection screen provided they come within the scope of the appended claims and their equivalents.

I claim:

1. A video projection screen for improving color distribution in a projected video image, the projected video image having a red component, a green component and a blue component, the video projection screen comprising:

a plurality of white reflective elements for reflecting the projected video image; and a plurality of blue reflective elements, evenly distributed amongst said plurality of white reflective elements, for reflecting the projected video image, said plurality of blue reflective elements increasing a reflective gain of the blue component of the projected video image and thereby improving the color distribution in the projected video image.

2. The video projection screen as set forth in claim 1 with said plurality of white reflective elements and said plurality of blue reflective elements including glass beads.

3. The video projection screen as set forth in claim 1 with said plurality of white reflective elements and said plurality of blue reflective elements including silicon particles.

4. A method for improving a video image by increasing perceived reflectance of a blue component relative to a red component and a green component from a video projector, comprising the step of:

- adding, in an even distribution, blue pigment to a standard white pigment of a projection screen material;
- whereby, responsive to the addition of blue pigment, a gain of the red component is decreased, a gain of the green component is decreased, and
- a perceived intensity of the blue component is increased.

5. A method for producing a balanced, full-color image on a video projection screen from a full-color white image produced by a video projector, the full-color white image having nominally a 33% red component, a 56% green component, and an 11% blue component, comprising the step of:

- interspersing, during manufacture of the video projection screen, a plurality of blue-pigmented reflective elements in an even distribution throughout a plurality of standard white reflective elements, thereby modifying a reflective index of the video projection screen;
- wherein, responsive to the modified reflective index, the full-color image resulting from projection of the full-color white image onto the video projection screen has a perceived blue component greater than 11%.

* * * * *